(12) United States Patent
Simpson et al.

(10) Patent No.: US 9,989,155 B2
(45) Date of Patent: Jun. 5, 2018

(54) CONNECTOR LINK FOR BUTTERFLY VALVE

(71) Applicant: Hamilton Sundstrand Corporation, Windsor Locks, CT (US)

(72) Inventors: Scott W. Simpson, Easthampton, MA (US); Josh Kamp, GVlastonbury, CT (US); Peter J. Dowd, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 23 days.

(21) Appl. No.: 14/536,992

(22) Filed: Nov. 10, 2014

(65) Prior Publication Data

US 2016/0131262 A1 May 12, 2016

(51) Int. Cl.
  *F16K 1/32* (2006.01)
  *F16K 1/22* (2006.01)
  *F16K 31/52* (2006.01)

(52) U.S. Cl.
  CPC .............. *F16K 1/32* (2013.01); *F16K 1/221* (2013.01)

(58) Field of Classification Search
  CPC ... F16K 1/32; F16K 1/22; F16K 31/52; F16K 31/521
  USPC .................................. 251/305, 279
  See application file for complete search history.

(56) References Cited

U.S. PATENT DOCUMENTS

| | | | |
|---|---|---|---|
| 2,300,483 A | 11/1942 | Berger et al. | |
| 3,028,179 A | 4/1962 | Abramoska | |
| 3,077,330 A | 2/1963 | Lamphear | |
| 3,191,972 A | 6/1965 | Collar | |
| 3,478,302 A | 11/1969 | Chirumbolo | |
| 3,625,251 A | 12/1971 | Nelson | |
| 4,625,746 A | 12/1986 | Calvin et al. | |
| 5,009,252 A | 4/1991 | Faughn | |
| 5,090,448 A | 2/1992 | Truchet | |
| 5,174,373 A | 12/1992 | Shinmura | |
| 5,187,316 A | 2/1993 | Hasler et al. | |
| 5,257,653 A | 11/1993 | Nimberger | |
| 5,351,708 A | 10/1994 | Donato et al. | |
| 5,738,143 A | 4/1998 | Faughn | |
| 2005/0028796 A1* | 2/2005 | Tussing | F02B 33/44 123/568.22 |
| 2009/0062159 A1* | 3/2009 | Mittendorf | F16C 33/12 508/103 |
| 2010/0319662 A1* | 12/2010 | Seiyama | F16K 11/0716 123/568.23 |

FOREIGN PATENT DOCUMENTS

WO    WO 2014127793 A1 *  8/2014    ........... F16K 31/521

* cited by examiner

*Primary Examiner* — Marina Tietjen
(74) *Attorney, Agent, or Firm* — Carlson, Gaskey & Olds, P.C.

(57) ABSTRACT

A connector link for use in an actuation system for a butterfly valve has a central web extending between two generally cylindrical ends. There are bores formed in each of two generally cylindrical ends and bushings extend axially upwardly from a nominal face at each of the ends. One of the ends has a bore formed at a radius defined as a first distance. A distance between center points of the bores in the first and second ends is defined as a second distance. The ratio of the second distance to the first distance is greater than or equal to 19.2772 and less than or equal to 19.4125. A valve and method are also disclosed.

6 Claims, 1 Drawing Sheet

CONNECTOR LINK FOR BUTTERFLY VALVE

BACKGROUND OF THE INVENTION

This application relates to a unique connector link for a butterfly valve.

Butterfly valves are known and are utilized in a number of applications. In general, a butterfly valve sits within a fluid flow duct and pivots between a blocking position and a flow allowing position. An actuator includes a piston which moves a link to pivot a connecting link. The connecting link then moves an arm to, in turn, pivot the butterfly valve within the duct between the restrictive and flow allowing positions.

In the prior art, the connecting link has had some deficiencies.

SUMMARY OF THE INVENTION

A connector link for use in an actuation system for a butterfly valve has a central web extending between two generally cylindrical ends. There are bores formed in each of two generally cylindrical ends and bushings extend axially upwardly from a nominal face at each of the ends. One of the ends has a bore formed at a radius defined as a first distance. A distance between center points of the bores in the first and second ends is defined as a second distance. The ratio of the second distance to the first distance is greater than or equal to 19.2772 and less than or equal to 19.4125. A valve and method are also disclosed.

These and other features may be best understood from the following drawings and specification.

DETAILED DESCRIPTION

Figure 1:
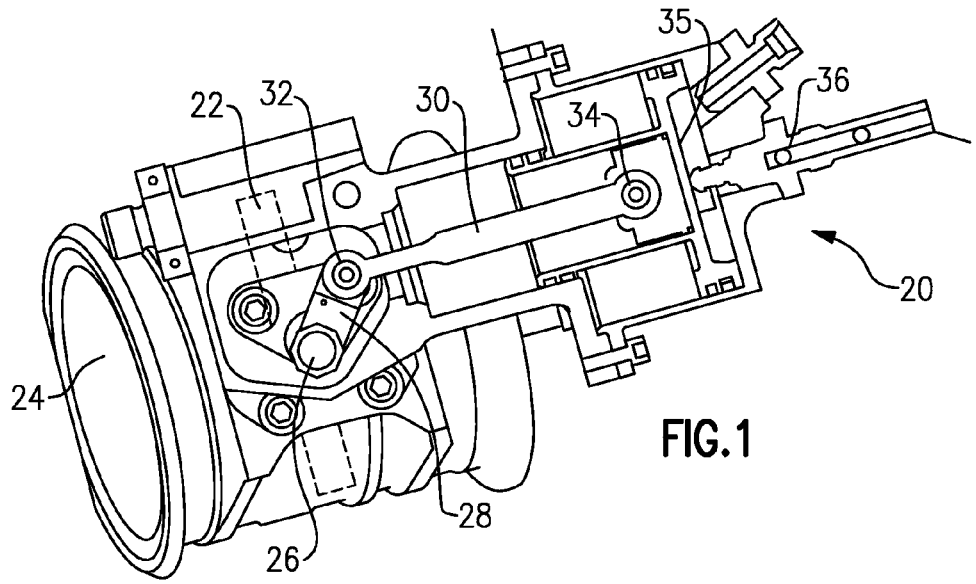
FIG. 1 schematically shows a butterfly valve and actuation system.

A butterfly valve and actuation assembly 20 is illustrated in FIG. 1. The valve 22 is positioned within a fluid flow duct 24 and pivots about a central pivot point 26. As known, an arm 28 drives the valve 22 to pivot and is moveable upon movement of a connector link 30. Link 30 has a first end 32 connected to the arm 28 and a second end 34 connected to a piston incorporated into an actuator 36. When a control for the system 20 decides that the butterfly valve 22 should change positions, it drives the piston 35 to, in turn, change the position of the butterfly valve 22.

Figure 2:
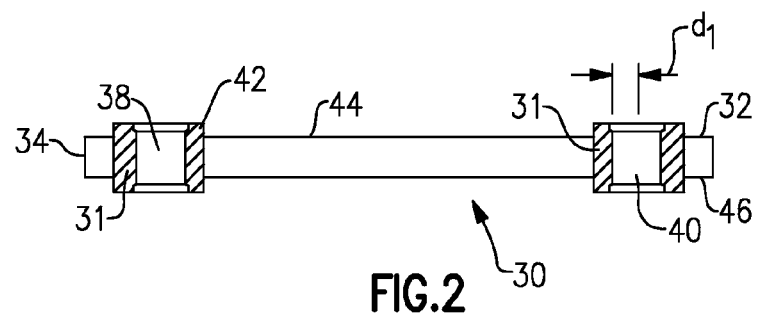
FIG. 2 is a side view of a connecting link.

FIG. 2 is a side view of the connector link 30. As shown, a bushing 31 at the end 32 has a bore 40 with a radius $d_1$. A bushing 31 at second end 34 also has a bore 38. The bore 38 may be formed to the same radius as the bore 40.

Figure 3:
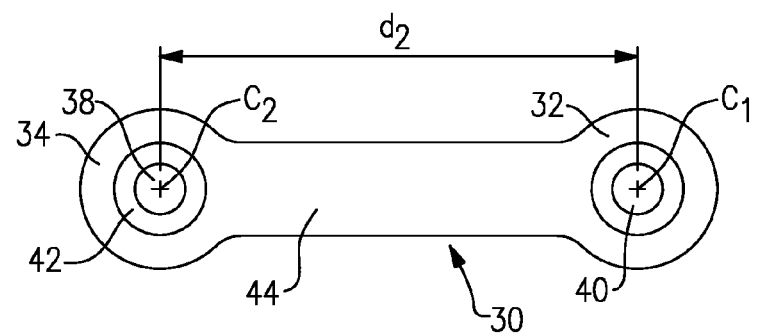
FIG. 3 is a top view.

As shown in FIG. 3, the bore 40 has a center point $c_1$ spaced from a center point $c_2$ of the bore 38 by a distance $d_2$. In embodiments, $d_1$ is greater than or equal to 0.1583 inch (0.4021 centimeter) and 0.1591 inch (0.4041 centimeter). The $d_2$ distance is greater than or equal to 3.0670 inches (7.7902 centimeters) and 3.0730 inches (7.8054 centimeters).

As shown in FIGS. 2 and 3, the connector link 30 has a central web 40, and the ends 32 and 34, which are generally cylindrical. The bushings 31 extend upwardly at 42, away from each of two opposed sides of a nominal surface area of the outermost portions 46 of the ends, and the web 44.

In embodiments, a ratio of $d_2$ to $d_1$ is between 19.2772 and 19.4125.

One material utilized to form the connector link 30 is 17-7PH stainless steel. The bushings 31 are formed of Stellite 6B®. Stellite 6B® is a cobalt alloy, and is a registered trademark of Kennametal, Inc.

In the prior connecting link, the $d_1$ dimension was 1.568 inches (3.982 centimeters) +/−0.0004 inch (0.0010 centimeter) and the $d_2$ dimension was 3.070 inches (7.797 centimeters) +/−0.003 inch (0.008 cm).

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A connector link for use in an actuation system for a butterfly valve comprising:
    a central web extending between two generally cylindrical ends;
    bores formed in bushings at each of the two ends and said bushings extending upwardly from a nominal face at each of said ends, a first of said bushings ends having said bore formed at a radius defined as a first distance, and a distance between center points of said bores in said first bushing and a second of said bushings being defined as a second distance;
    a ratio of said second distance to said first distance being greater than or equal to 19.2772 and less than or equal to 19.4125; and
    wherein a radius of said bore in said second bushing is equal to said first distance.

2. The connector link as set forth in claim 1, wherein said connector link is formed of a stainless steel, and said bushings are formed of a cobalt alloy.

3. A butterfly valve and actuation system comprising:
    a butterfly valve pivotally mounted within a fluid flow duct and an actuation system including a piston attached to one end of a connector link and the connector link including an arm attached at a second end to pivot said butterfly valve, with the connector link including a central web extending between two generally cylindrical ends;
    bores formed in bushings at each of said two ends and said bushings extending upwardly from a nominal face at each of said ends, a first of said bushings having said bore formed at a radius defined as a first distance, and a distance between center points of said bores in said first bushing and a second of said bushings being defined as a second distance, and a ratio of said second distance to said first distance being greater than or equal to 19.2772 and less than or equal to 19.4125;
    wherein a radius of said bore at said second bushing is equal to said first distance; and
    wherein an intermediate link connects said connector link to said butterfly valve.

4. The butterfly valve and actuation system as set forth in claim 3, wherein said connector link is formed of a stainless steel, and said bushings are formed of a cob alt alloy.

5. A method of replacing a connector link comprising the steps of:
    removing a connector link from a butterfly valve assembly including a piston fixed to pivot a first end of the connector link, and a second end of the connector link attached to an intermediate arm for pivoting a butterfly valve within a fluid flow duct, and including the step of replacing the removed connector link;

wherein the replaced connector link has a central web extending between two generally cylindrical ends, bores formed in bushings at each of the two ends and said bushings extending upwardly from a nominal face at each of said bushings, a first of said bushings having said bore formed at a radius defined as a first distance, and a distance between center points of said bores in said first bushing and a second of said bushings being defined as a second distance, and a ratio of said second distance to said first distance being greater than or equal to 19.2772 and less than or equal to 19.4125; and wherein a radius of said bore at said second bushing is equal to said first distance.

6. The method as set forth in claim 5, wherein said connector link is formed of a stainless steel, and said bushings are formed of a cob alt alloy.

* * * * *